United States Patent [19]

Aiko

[11] Patent Number: 4,864,420
[45] Date of Patent: Sep. 5, 1989

[54] IMAGE RECORDER WITH PLURAL EXPOSURE SURFACES

[75] Inventor: Yasuyuki Aiko, Yokohama, Japan

[73] Assignee: Canon Kabushiki Kaisha, Tokyo, Japan

[21] Appl. No.: 151,167

[22] Filed: Feb. 1, 1988

[30] Foreign Application Priority Data

Feb. 3, 1987 [JP] Japan .................................. 62-23282
Feb. 4, 1987 [JP] Japan .................................. 62-24149

[51] Int. Cl.$^4$ .............................................. H04N 1/21
[52] U.S. Cl. ..................................... 358/302; 346/108
[58] Field of Search ....................... 358/302, 300, 296; 346/108, 107 R

[56] References Cited

U.S. PATENT DOCUMENTS 4,580,167 4/1986 Diete .................................. 358/302
4,711,553 12/1987 Watanabe .......................... 358/300

Primary Examiner—C. L. Albritton
Assistant Examiner—Mark Reinhart
Attorney, Agent, or Firm—Fitzpatrick, Cella, Harper & into

[57] ABSTRACT

An image taking apparatus consisting of a main unit capable of image recording in at least one of a first recording mode in which an object image is focused by a focusing system onto an image reading device is photoelectrically read and a second recording mode in which the object image is focused by a focusing system onto a recording medium for image recording, and a sub unit detachably attachable to the main unit is used for the recording in the second recording mode, and, when it is attached to the main unit, it receives the light image of the object image from the main unit and executes recording in the second recording mode.

16 Claims, 3 Drawing Sheets

IMAGE RECORDER WITH PLURAL EXPOSURE SURFACES

BACKGROUND OF THE INVENTION

1. Field of the Invention

The present invention relates to an image taking apparatus for recording and storage of an object image.

2. Related Background Art

For the purpose of recording or storage of various image information of objects, such as important documents, printed matters, drawings, cheques or the like:

(1) recently developed are electronic files in which the object image is focused through imaging means onto image reader means, such as an image sensor, and is photoelectrically read to obtain electric pixel signals, which are stored in an external memory such as a magnetic medium or an optical disk, and desired image information thus stored is retrieved when raquired and is reproduced as an optical signal either in the form of a hard copy or in the form of a displayed image, for example, on a cathode ray tube;

(2) conventionally there has also been known a microfilm system in which the object image is recorded in a reduced size through imaging means onto a recording medium composed of a photographic film. Also, the object image may be recorded or stored in a same or reduced size by focusing on a recording medium other than the photographic film, such as an electrophotographic photosensitive member.

In the following description, for the purpose of simplicity, the recording mode (1) for photoelectrically reading and storing the object image with image reader means will be called the first recording mode, and the recording mode (2) for recording and storing the object image on a recording medium will be called the second recording mode.

The first recording mode is superior in rapid retrieval and editing of the recorded image information, while the second recording mode is superior, in case of using a microfilm, in storage performance, recording density, suitability for legal evidence etc.

Consequently combined and complementary use of the first and second recording modes allows one to fully exploit the advantages of these modes, thus realizing an improved system for recording, storage, administration and utilization of the object image information.

Conventionally, the first recording mode and the second recording mode are conducted in mutually independent stand-alone units. Therefore, in order to realize the above-mentioned combined system, it has been necessary to hold a unit for the first recording mode and another unit for the second recording mode, and to record the object image at first with one of said units and then with the other.

It is, however, significantly detrimental, in terms of the cost, space required and work efficiency, to have two independent units and to repeat two operations by independent type units for every original image.

SUMMARY OF THE INVENTION

In consideration of the foregoing, an object of the present invention is to provide a multifunctional image taking apparatus capable of recording an object image by the first and second recording modes in a single image taking operation, thereby achieving improved work efficiency, and realizing a compact and inexpensive apparatus which therefore can resolve the problem of equipment cost and space required for installation and the like.

Another object of the present invention is to provide an image taking apparatus comprising:

a main unit provided with a first recording device for projecting an object image on a first exposure surface through imaging means and recording a thus projected image in a first recording mode; and a subunit detachably mountable on said main unit and provided with a second recording device capable, in a state mounted to said main unit, of receiving a light image of the object image from the main unit and recording said image in a second recording mode.

Still another object of the present invention is to provide an image taking apparatus provided with light path dividing movable means which, when the subunit is mounted to the main unit, enters a light path in said main unit thereby dividing the light therein.

According to the present invention, the main unit alone can record the object image in the first recording mode provided in said main unit.

When the subunit is mounted on the main unit, the light path dividing means introduces, from the light path of the main unit, a divided light image of the object image into the subunit, thereby effecting the image recording by the subunit simultaneously with the image recording by the main unit. In this manner, the recordings of the object image in the first and second recording modes are efficiently conducted by a single image taking operation.

Components common to the recording devices of the first and second recording modes, such as a platen for illuminating the object, illuminating means, automatic feeding means for the object etc. are only needed in the main unit but are not needed in the subunit, so that the entire image taking apparatus of plural functions for effecting the first and second recording modes can be realized compactly with low cost, thereby reducing the equipment cost and the space required for installation.

Thus, the combined use of the first and second recording modes enables rational and economic utilization of an improved system for recording, storage, administration and utilization of the object image information.

DETAILED DESCRIPTION OF THE PREFERRED EMBODIMENTS

Figure 1:
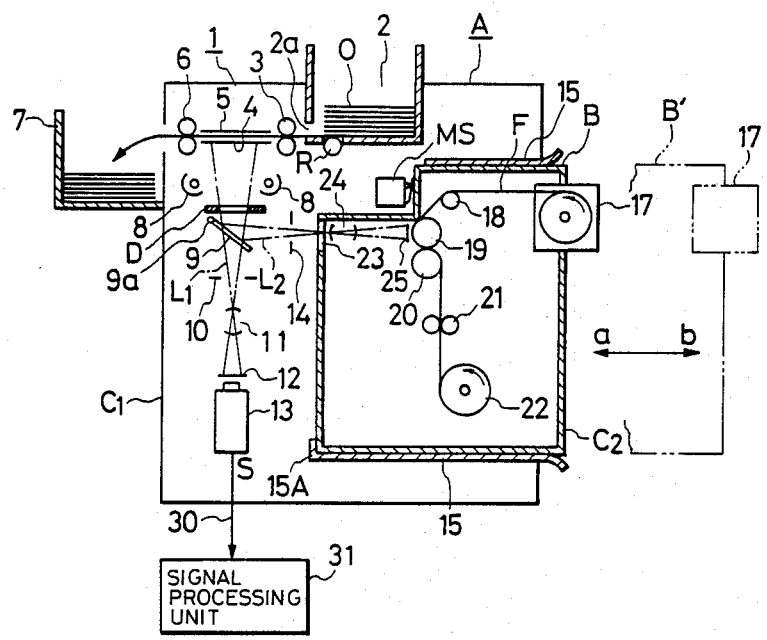
FIG. 1 is a schematic view of an apparatus constituting a first embodiment.
Figure 2:
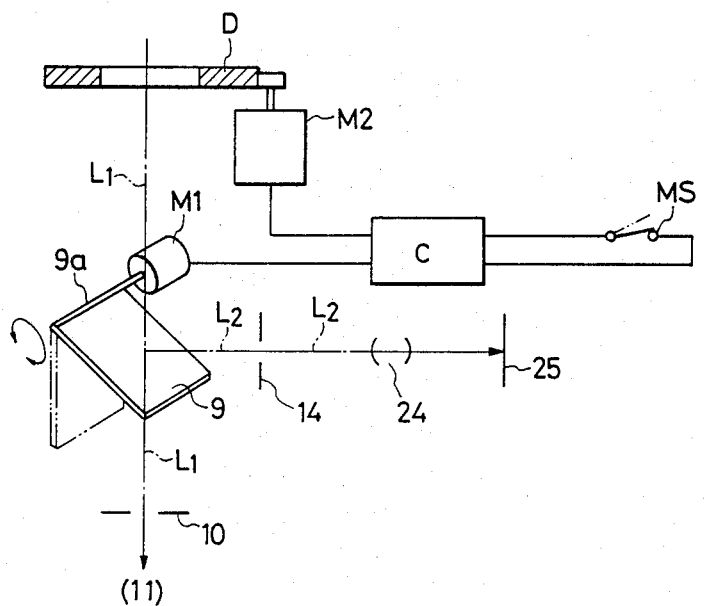
FIG. 2 is a block diagram of a control system for a movable half mirror and a variable diaphragm in said apparatus.
Figure 3:
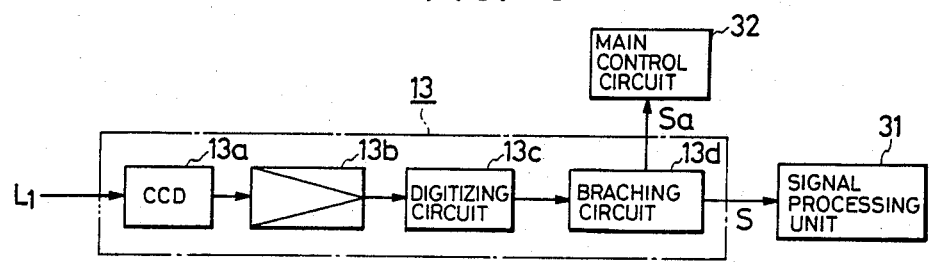
FIG. 3 is a block diagram of an image reading unit.

First Embodiment (FIGS. 1 to 3)

In FIG. 1, A generally indicates a main unit (first recording unit) while B generally indicates a subunit (second recording unit) detachably attachable to said main unit A as indicated by arrows a, b. FIG. 1 illustrates a state in which the subunit B is mounted on the main unit A.

In the present embodiment, the main unit A is provided with a recording device of the first recording mode, namely a device (image scanner) for focusing an object image through imaging means onto image reading means positioned at a first exposure surface and photoelectrically reading said image, while the subunit B is provided with a recording device of the second recording mode for image recording by focusing the object image through imaging means onto a recording medium positioned on a second exposure surface, more specifically a microfilm camera.

The main unit A comprises an automatic original feeder 1 positioned on top of said unit; an original stacker 2 for holding originals 0 to be recorded, such as cheques, drafts, security notes, business forms, drawings or other documents with the image bearing faces thereof downwards; a pair of original feeding rollers 3; a platen glass plate (image taking portion) 4; a guide plate 5 positioned above the plate 4 with a gap thereto; a pair of original discharge rollers 6; and a tray 7 for receiving already recorded originals. There are also provided an original illuminating lamp 8 so positioned as to illuminate the lower face of the glass plate 4; a variable diaphragm D for regulating the amount of light in the optical path; a half mirror 9 serving as light path dividing means; a first slit plate 10 on the optical path transmitted by the half mirror; a photographing lens 11 serving as the imaging means; a shutter 12; an image reader 13 containing a solid-state image sensor array such as a CCD array serving as the image reading means; a second slit plate 14 on the optical path reflected by the half mirror 9; a guide member 15 for the subunit B to be mounted to the main unit A by insertion therein; a stopper member 15A for placing the subunit B in a predetermined position with respect to the main unit A; and a microswitch MS for detecting whether the subunit B is mounted in the predetermined position of the main unit A. In the main unit, the automatic original feeder, light amount regulating means, imaging means, image reading means, etc. are provided in a first casing C1.

In the above-explained apparatus, the half mirror 9 is rendered rotatable about a shaft 9a, between a first position in which the half mirror is inserted in the optical path of the main unit with an angle of about 45° to the optical axis, as indicated by solid lines in FIGS. 1 and 2, and a second position in which the half mirror is retracted downwards from the optical path as indicated by chain lines. In the present embodiment the rotary shaft 9a on which the half mirror is fixed is driven by a motor M1 (FIG. 2), and the switching of the half mirror between the first and second positions is conducted by current control of the motor M1. The variable diaphragm D is controlled by a motor M1 (FIG. 2). Motors M1, M2 are controlled by a control circuit C, which also receives and on-off signal of the microswitch MS for detecting whether the subunit B is mounted on the main unit A.

In the subunit B, a film cassette 17 loaded in the subunit B contains a long unexposed photographic film F wound as a roll. The leading end of the film is threaded manually or by automatic loading on a guide roller 18, a nip between a capstan roller 19 and a pinch roller 20, and a nip between feeding rollers 21, and wound on a take-up reel 22. There are also provided a shutter 25 provided in front of the capstan roller 19; a projection lens 24 provided in front of the shutter and serving as imaging means; and an aperture 23 provided in the wall of a second casing C2 positioned in front of the lens. The above-mentioned aperture 23, lens 24, shutter 25 and capstan roller 19 are arranged on a same axis which coincides, when the subunit B is properly mounted on the main unit A, with the axis of the light reflected by the half mirror 9 inserted into the optical path of the main unit A, so that the light L2 reflected by the half mirror 9 introduced, through the second slit plate 14 and the aperture 23 in the wall of the second casing, into the subunit B. The cassette, film transporting means, imaging means etc. are provided in the second casing C2 of the subunit, which is detachably mountable to the first casing.

(1) The main unit A can function as the image taking apparatus of the first recording mode regardless of whether or not the subunit B is mounted or not.

When the subunit B is not mounted, the microswitch MS is turned off, whereby the motors M1, M2 are controlled by the control circuit C to switch the half mirror 9 to the second position retracted from the optical path and to automatically control the variable diaphragm D at a value matched to the state without the half mirror in the optical path.

The originals 0 contained in the stacker 2 of the automatic original feeder 1 are fed one by one, from the lowermost one through an original feeding slot 2a by means for feeding paper one by one such as a feeding roller R, then introduced into the gap between the glass plate 4 and the guide plate 5 with a predetermined constant speed by means of the transport rollers 3, and further advanced toward the discharge rollers 6.

The original illuminating lamp 8 is turned on when or before unrepresented original detector means detects the arrival of the leading end of the transported original at a predetermined scanning start position on the glass plate 4, and the shutter 12 is maintained open in response to an original detection signal from the original detector means.

In the course of transportation on the glass plate 4, the image bearing face of the original is continuously illuminated from leading end to the trailing end by the lamp 8 through the glass plate 4, and the reflected light is projected, through the first slit plate 10, projection lens 11 and shutter 12 in the open state, onto the image reader unit 13 containing the solid-state image sensor array.

The image on the lower face of the original is thus photoelectrically read in succession from the leading end to the trailing end of the original by means of the main scanning function of the image reader unit 13 and the subscanning function achieved by the movement of the original at a predetermined speed on the glass plate 4, and the image reader 13 releases an image signal S in the form of time-sequential digital pixel electric signals.

The original transported on the glass plate 4 by the transport rollers 3 is then advanced by the discharge rollers 6 when the leading end of the original reaches said rollers, and is discharged to the external tray 7. Then there is repeated a cycle of feeding the lowermost original in the stacker 2 to the glass plate 4 and reading the image thereof, for all the originals contained in the stacker 2.

The image signal S from the image reader unit 13 is transmitted through a transmission cable 30 to a signal processing device 31, for example, an electronic editing system provided with an external memory such as a magnetic medium or an optical disk and with a CPU, for recording, storing or editing the image.

In this manner, the original image is recorded and stored in the first recording mode, thus enabling real-time processing or classification of the image by the electronic editing system. Also, a high density external memory such as an optical disk may be employed for mutual backup with the microfilm to be explained later, thereby improving the security of the system.

(2) The main unit A, when combined with the subunit B, functions as a multi-functional image taking apparatus capable of image recordings with the first and second recording modes in a single image taking operation. By inserting the second casing C2 of the subunit B from a chain-lined position B' into the first casing C1 along the guide member 15 of the main unit A, said subunit B is mounted at a predetermined position in contact with the stopper member 15A.

When the subunit B is mounted on the main unit A, the microswitch MS is turned on, whereby the motors M1, M2 are controlled by the control circuit C to switch the half mirror 9 to the first position inserted into the optical path, so that the optical path is divided into the transmitted light path and the reflected light path. Also, the variable diaphragm D is automatically controlled to a value matched to a state containing the half mirror in the optical path. More specifically, when the subunit B is mounted, the variable diaphragm D is so regulated as to transmit a larger amount of light.

Also, an unrepresented mechanism of the subunit B is mechanically coupled with the unrepresented driving mechanism of the automatic original feeder 1 of the main unit A, so that the capstan roller 19, feed rollers 21 and take-up reel 22 of the subunit B are driven in linkage with the original feeding in the main unit A.

Also, an electric circuit of the subunit B is electrically coupled with an unrepresented control circuit of the main unit A, so that the subunit B can be electrically controlled by the control circuit of the main unit A.

When the original is fed to the glass plate 4 by the automatic original feeder 1 of the main unit A, the lower face of the original transported at a predetermined speed on the glass plate 4 is illuminated by the lamp 8 as explained before, and the reflected light from the original is guided to the half mirror 9, and the transmitted light L1 from the half mirror 9 is photoelectrically read by the image reader unit 13 as explained before.

Also, the light L2 reflected by the half mirror 9 is introduced, through the second slit plate 14 and the aperture 23, into the subunit B. The shutter 25 of the subunit B is controlled in synchronization with the shutter 12 of the main unit A. Also, the capstan roller 19, feed rollers 21 and take-up reel 22 are driven by the mechanism of the automatic original feeder 1 of the main unit A, and are rotated in synchronization with the image reading in the image reader unit 13 of the main unit A, thereby advancing the photographic film at a predetermined speed. The film advancing speed is calculated from the transport speed of the original O on the glass plate 4 and the image reducing rate of the lens 24.

The light L2 reflected by the half mirror 9 and introduced into the subunit B is guided through the imaging lens 24 and the opened shutter 25, and is recorded, in a reduced size, through a slit, on the photographic film F supported on the generally left-hand periphery of the capstan roller 19 and transported thereby, thus forming a microfilmed image.

FIG. 3 is a block diagram of the image reader unit 13 of the main unit A, wherein the solid-state image sensor array 13a, such as a CCD, executes photoelectric conversion of the light L1 transmitted by the half mirror 9 and focused thereon. The photoelectrically converted signal is amplified by an amplifier 13b, then binary digitized by a digitizing circuit 13c, and supplied through a branching circuit 13d, in the form of time-sequential digital pixel signals S, to the signal processing unit 31, such as an external memory. The branching circuit 13d also releases a synchronization signal Sa for the subunit B to a main control circuit 32, whereby the synchronization signal Sa controls the function of the subunit B to achieve the image recording by the subunit B in the second recording mode simultaneously with the image recording by the main unit A in the first recording mode. Upon completion of the image recordings with both recording modes for the same original, the image recording operation is conducted for the next original.

In this manner a single original feeding to the glass plate 4 enables simultaneous image recordings in the first recording mode in the main unit A and in the second recording mode in the subunit B.

The exposed photographic film in the subunit B is subsequently developed, and either stored or classified.

Figure 4:
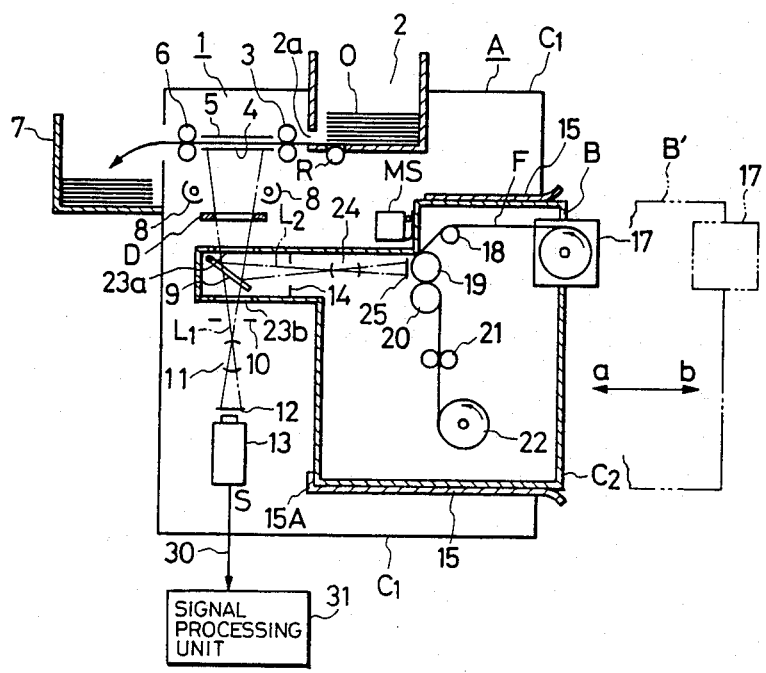
FIG. 4 is a schematic view of an apparatus constituting a second embodiment.

Second Embodiment (FIG. 4)

In this embodiment, modified from the one shown in FIG. 1, the half mirror 9 and the second slit plate 14 are provided in the subunit B instead of the main unit A, but other components are structured the same as in the foregoing embodiment. In FIG. 4, the second casing C2 of the subunit B is provided, on the wall thereof, with apertures 23a, 23b larger than the size of the optical path of the main unit A, and the half mirror 9 is positioned in the second casing C2, between the apertures 23a, 23b.

The half mirror 9 is so positioned in the subunit B, when the subunit B is mounted on the main unit A, as to be inserted into the optical path of the main unit A, with an angle of about 45°. Consequently in the present embodiment the mirror driving motor M1 shown in FIG. 2 is not provided.

When the subunit B is not mounted to the main unit A, the microswitch MS is turned off, whereby the motor M2 (FIG. 2) is controlled by the control circuit to automatically control the variable diaphragm D to a value matched to a state without the half mirror 9 in the optical path. Because of the absence of the half mirror 9 in the optical path, the light reflected by the original O transported on the glass plate 4 is guided through the first slit plate 10, projection lens 11 and opened shutter 12 and is focused on the image reader unit 13.

When the subunit B is mounted to the main unit A, the half mirror 9 of the subunit B is inserted into the optical path of the main unit A, and the microswitch MS is turned on, whereby the motor M2 is controlled by the control circuit C to automatically regulate the variable diaphragm D to a value matched to a state with the half mirror 9 in the optical path.

The light reflected from the original on the glass plate 4 is introduced to the half mirror 9 through the upper aperture 23a of the casing of the subunit, and the light L1 transmitted by said half mirror 9 is guided through the lower aperture 23b and the first slit plate 10 and introduced to the image reader unit 13 of the main unit A. Also the light L2 reflected by the half mirror 9 is guided through the second slit plate 14 and reaches the capstan roller 19 of the subunit B for exposing the film.

In this manner, the image recordings by the main unit A in the first recording mode and by the subunit B in the second recording mode can be achieved simultaneously for the same original.

The presence of the half mirror 9 serving as an optical path dividing member in the subunit B not only reduces the cost of the main unit A but also improves the precision of axial matching with the photographic film F. Also the image recording can be achieved with an optimum amount of light by using a half mirror of a light dividing ration corresponding to the image magnification of the projection lens 24.

The half mirror 9, if constantly inserted in the optical path of the main unit A, will cause a loss in the amount of light in the recording system of the main unit A when the subunit B is not mounted to the main unit A. It is, however, possible to resolve this drawback and to increase the speed of image taking, by forming said half mirror as a movable member which is inserted into the optical path of the main unit for light division into the subunit B when it is mounted to the main unit A, but is retracted from the optical path when the subunit B is not mounted to the main unit A. The variable diaphragm D is so controlled, in response to the attachment of subunit B to or detachment thereof from the main unit A, or in response to the insertion of the half mirror 9 into or retraction thereof from the optical path, to optimize the amount of light entering the image reader unit 13 of the main unit A and the recording medium F of the subunit B when the optical path is divided by the insertion of the half mirror 9, or to optimize the amount of light entering the image reader unit 13 of the main unit A when the half mirror 9 is retracted from the optical path.

In the foregoing first and second embodiments, the recording devices of the second recording mode may be provided in the main unit A, and that of the first recording mode may be provided in the subunit B.

The solid-state image sensor array 13a, such as a CCD (FIG. 3), constituting the image reading unit 13 of the first recording mode may be replaced, for example, by an image pickup tube if it is capable of photoelectric conversion with a sufficient resolving power.

Also the microfilming device for the second recording mode may be replaced for example by a copying process device such as an electrophotographic device utilizing a photosensitive drum.

The means for detecting the mounting of the subunit B is not limited to a microswitch but can be composed of any means capable of confirming the presence or absence of the subunit B on the main unit A.

The light amount regulating means is not limited to the mechanically driven diaphragm D in the foregoing embodiments but can be composed of electric means, such as a liquid crystal shutter or electric regulation of the lamp, and such electric means is advantageous because of its simple structure.

The mechanism for moving the half mirror 9 between the first and second positions in the first embodiment is not limited to a rotary mechanism but can be any mechanism, for example a parallel moving mechanism, capable of stably supporting the half mirror in a predetermined position in the optical path when light path division is necessary and moving the half mirror from said optical path when the division is not required.

In the foregoing first and second embodiments the original is scanned by the movement thereof, but it is also possible to scan the fixed original by moving an optical system or an image sensor and a recording medium, or to record the image of the fixed original with a flash exposure by a two-dimensional image sensor and a flat recording medium.

Also there may be provided mode selector means for enabling the image taking in one of the recording modes of the main unit A and the subunit B, in a state the subunit B is mounted on the main unit A.

It is also possible, after the image taking in the first recording mode only, to convert the necessary information only, out of the information recorded in the external memory 31, into light signal for recording on a recording medium, such as a microfilm. In this manner it is rendered possible to record, on a recording medium, such as a microfilm, the information after electronic editing.

Figure 5:
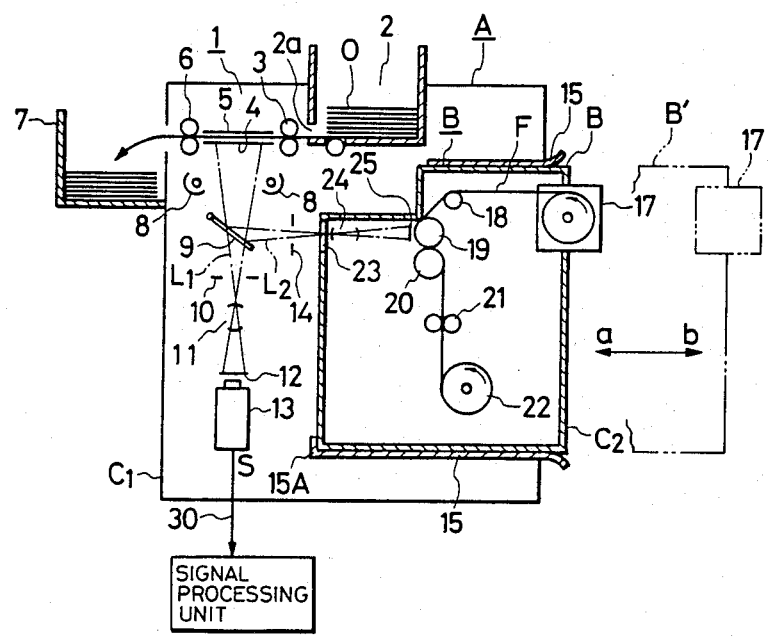
FIG. 5 is a schematic view of an apparatus constituting a third embodiment.

Third embodiment (FIG. 5)

In this embodiment, modified from the embodiment shown in FIG. 1, the half mirror 9 serving as the optical path dividing means is fixed, with an angle of about 45°, in a first optical path between the glass plate 4 and the image reader unit 13, while other components are arranged in a similar manner to that shown in FIG. 1. Since the half mirror 9 is fixed, the light reflected from the original is always partly reflected by the half mirror toward the subunit B through a second optical path, regardless whether the subunit B is mounted or not. Therefore, in the present embodiment the motor M1 for driving the mirror is not provided.

In this embodiment, there may be provided mode selector means for enabling the image taking in one of the recording modes of the main unit A and the subunit B, in a state the subunit B is mounted on the main unit A.

It is also possible, after the image taking in the first recording mode only, to convert the necessary information only, out of the information recorded in the external memory 31, into light signal for recording on a recording medium, such as a microfilm. In this manner it is rendered possible to record, on a recording medium, such as a microfilm, the information after electronic editing.

It is furthermore possible to introduce the light reflected through the glass plate 4, directly into the optical system of the main unit A and that of the subunit B, without utilizing the optical path dividing member such as the half mirror 9.

The image taking with an optimum amount of light can be achieved by the use of a half mirror of a light dividing ratio matching the image magnification of the projection lens 24.

What is claimed is:

1. An image recorder with plural exposure surfaces comprising:
    a first casing;
    a first optical means arranged in the first casing and forming a first optical path for projecting an original image onto a first exposure surface;
    a first reading means arranged on the first exposure surface for reading the original image;
    a second optical means for forming a second optical path divided from the first optical path;
    a second casing detachable attachable to a predetermined position of said first casing, said second casing comprising a third optical means for forming a third optical path to project the original image onto the second exposure surface and a second reading means for reading the original image projected onto the second exposure surface, and the original image being projected onto the second exposure surface through each of the optical paths when the second casing is attached at the predetermined position;

detecting means for detecting that the second casing is attached at the predetermined position; and control means for controlling the reading of the original image in accordance with an output from the detecting means.

2. An image recorder according to claim 1, wherein said second optical means comprising light dividing means which divides the light from the original image into light beam directed towards said first exposure surface and said second exposure surface.

3. An image recorder according to claim 1, wherein said second optical means has a mirror being movable so as to be insertable in the first optical path and retractable therefrom, and said control means controllably moves said mirror in accordance with the output from said detecting means.

4. An image recorder according to claim 3, wherein said second optical means is disposed in said second casing and forms the second optical path when said second casing is attached at the predetermined position.

5. An image recorder according to claim 3, wherein said second optical means is provided in said first casing.

6. An image recorder according to claim 1, wherein said second optical means is provided in said first casing.

7. An image recorder according to claim 1, wherein said first reading means comprises an image sensor for reading the original image and converting the same into an image signal.

8. An image recorder according to claim 1, wherein said second reading means has a photosensitive member for recording the original image.

9. An image recorder according to claim 8, wherein said photosensitive member is a microfilm.

10. An image recorder according to claim 1, wherein the images read by said first and second reading means are recorded on separate recording mediums, respectively.

11. An original processing apparatus comprising:
first optical means for forming a first optical path to project an original image;
second optical means for forming a second optical path to project the original image;
a photo-sensor which is disposed in the first optical path and receives light from the original image to generate a signal corresponding to the original image;
changing-over means for changing over to form the first or second optical path;
recording means detachably mounted in the second optical path and recording the original image on a recording medium;
detecting means for detecting the mounting of the recording means; and
control means for controlling the amount of exposure light to at least one of the photo-sensor or the recording medium in accordance with an output from the detecting means.

12. An apparatus according to claim 11, wherein said changing-over means includes a mirror insertable into said first optical path and retractable therefrom and driving means for moving said mirror.

13. An apparatus according to claim 11, wherein a mirror is composed of a light transmittable mirror, and the original image is simultaneously projected onto both of the photo-sensor and the recording medium, when said mirror is inserted into said first optical path.

14. An apparatus according to claim 13, wherein said mirror is a half mirror.

15. An apparatus according to claim 11, wherein said changing-over means is controlled in accordance with the output from said detecting means.

16. An image recorder comprising: means for conveying an original document to a reading position;
first recording means for recording on a first recording medium an image of the original document placed on said reading position;
a second recording means for recording detachably mountable at a predetermined position of the recorder, said second recording unit having a mirror which transmits and reflects light, optical means for directing the light reflected by said mirror to a second recording medium, holding means for holding said second recording medium, and moving means for moving said second recording medium in a direction in which said second recording medium is moved across the optical path of said optical means, said mirror being disposed in an optical path formed between the reading position and the first recording medium when said second recording means is mounted at the predetermined position;
detecting means for detecting the mounting of said second recording means; and
control means for controlling the light exposure to said second recording medium in accordance with the output from said detecting means.

* * * * *

UNITED STATES PATENT AND TRADEMARK OFFICE
CERTIFICATE OF CORRECTION

PATENT NO. : 4,864,420
DATED : September 5, 1989
INVENTOR(S) : Yasuyuki Aiko

It is certified that error appears in the above-identified patent and that said Letters Patent is hereby corrected as shown below:

SHEET 2:

Figure 3, "BRACHING" should read --BRANCHING--.

COLUMN 1:

Line 19, "raquired" should read --required--.

COLUMN 3:

Line 54, "motor M1" should read --motor M2--.

Line 56, "and" should read --an--.

COLUMN 8:

Line 67, "detachable" should read --detachably--.

UNITED STATES PATENT AND TRADEMARK OFFICE
CERTIFICATE OF CORRECTION

PATENT NO. : 4,864,420

DATED : September 5, 1989

INVENTOR(S) : Yasuyuki Aiko

It is certified that error appears in the above-identified patent and that said Letters Patent is hereby corrected as shown below:

COLUMN 9:

Line 16, "comprising" should read --comprises--.

COLUMN 10:

Line 30, "comprising: means" should read --comprising: means--. (The word "means" should be a new paragraph.)

Line 37, "second recording unit" should read --second recording means--.

Signed and Sealed this

Ninth Day of April, 1991

Attest:

HARRY F. MANBECK, JR.

*Attesting Officer*  *Commissioner of Patents and Trademarks*